United States Patent
Baker

[19]

[11] Patent Number: 6,152,081
[45] Date of Patent: Nov. 28, 2000

[54] QUASISTABLE DOG KENNEL

[76] Inventor: Michael D. Baker, 1024 NW. 9th St., Corvallis, Oreg. 97331-6145

[21] Appl. No.: 09/250,694

[22] Filed: Feb. 16, 1999

[51] Int. Cl.[7] .............................. A01K 1/035; A47D 9/02
[52] U.S. Cl. .......................... 119/498; 119/499; 119/504; 119/474; 5/105; 5/108
[58] Field of Search ..................................... 119/498, 499, 119/482, 452, 504, 502, 472, 474; 5/105, 108; D30/114, 120

[56] References Cited

U.S. PATENT DOCUMENTS

| | | |
|---|---|---|
| 89,953 | 5/1869 | Swartz . |
| 246,729 | 9/1881 | Darne . |
| 744,993 | 11/1903 | Barta . |
| 855,551 | 6/1907 | Avara . |
| 1,170,794 | 2/1916 | Barnes . |
| 1,203,080 | 10/1916 | Vanek . |
| 1,383,727 | 7/1921 | Kohn . |
| 1,433,777 | 10/1922 | Brown . |
| 1,893,918 | 1/1933 | Wilson . |
| 2,688,997 | 9/1954 | Miller . |
| 3,116,847 | 1/1964 | Collins . |
| 3,858,555 | 1/1975 | Smith ....................................... 119/513 |
| 4,615,059 | 10/1986 | Darowski .................................. 5/108 |
| 4,762,085 | 8/1988 | Ondrasik ................................... 119/17 |
| 5,201,498 | 4/1993 | Akins ....................................... 256/26 |
| 5,375,815 | 12/1994 | Akins ....................................... 256/26 |
| 5,452,681 | 9/1995 | Ho ............................................. 119/17 |
| 5,564,367 | 10/1996 | Boyanton ................................ 119/474 |
| 5,653,194 | 8/1997 | Guy .......................................... 119/453 |
| 5,711,252 | 1/1998 | Brandolino .............................. 119/673 |
| 5,803,018 | 9/1998 | Liou ......................................... 119/461 |
| 5,806,113 | 9/1998 | McMahan et al. ......................... 5/109 |

Primary Examiner—Peter M. Poon
Assistant Examiner—Yvonne R. Abbott

[57] ABSTRACT

A kennel system for confining domestic dogs consisting of four panel members (FIG. 5A) attached through a spring biasing element (FIG. 8) is presented. Each panel member consists of a first and second vertical corner post attached to upper and lower horizontal members. Each horizontal member contains a behavioral modification element (FIG. 4) for allowing each panel member to balance about a point. Consequently, when the contained animal brushes against the panels, they oscillate. This oscillatory motion startles the animal causing it to move away from the panels and towards the center of the kennel, thus, reinforcing desired behavior. Since the kennel system works in conjunction with the dog's natural instinct to move away from unstable objects, the top of the kennel is eliminated and the panels are lowered to allow for human interaction with the animal while it is confined.

18 Claims, 6 Drawing Sheets

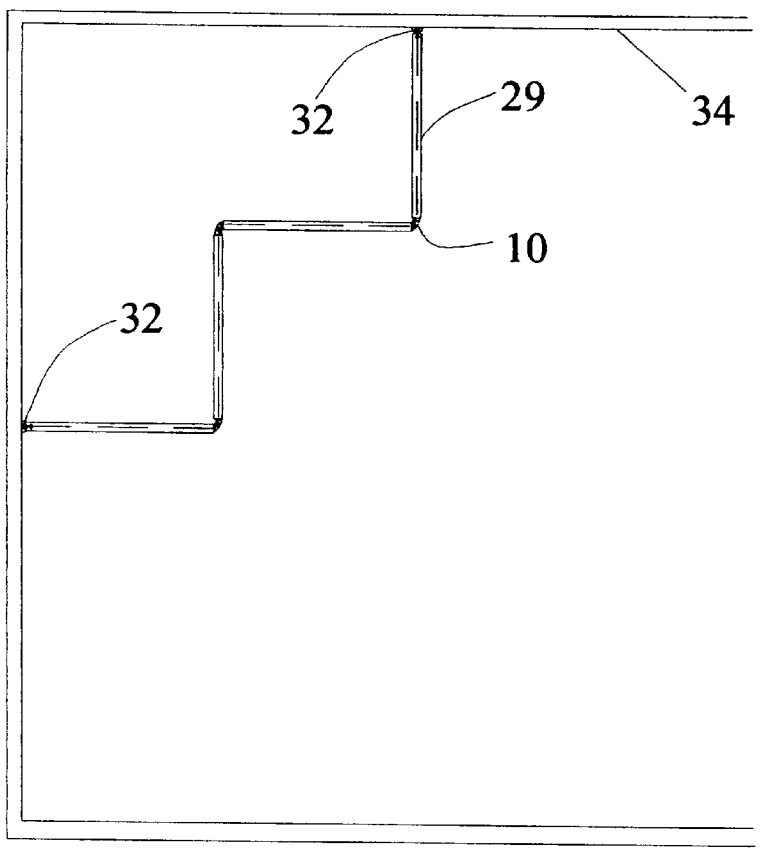
Figure 10A
Figure 10B
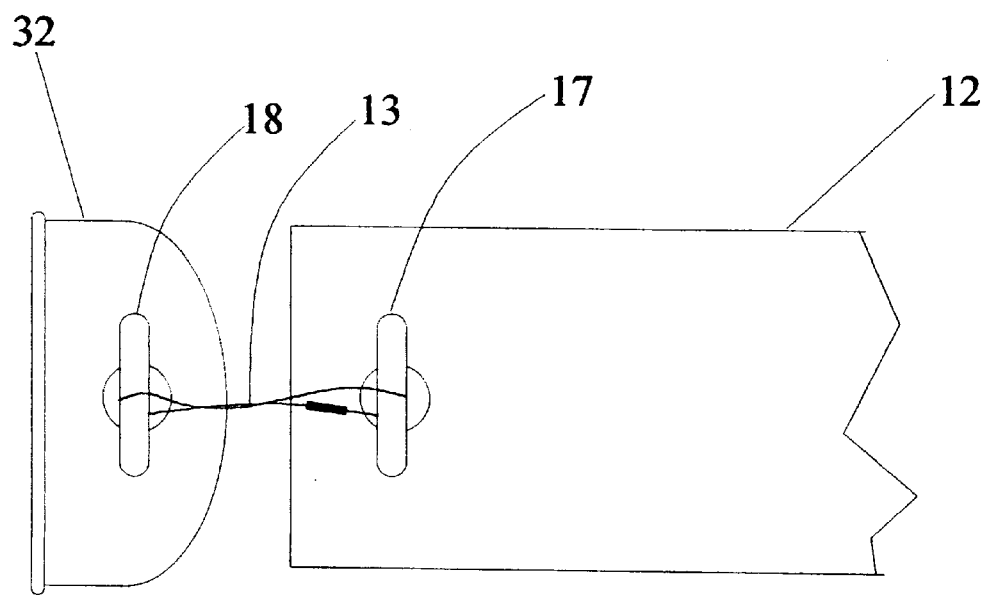

QUASISTABLE DOG KENNEL

BACKGROUND—FIELD OF INVENTION

This invention relates to a kennel system for confining small domestic dogs.

BACKGROUND—DESCRIPTION OF PRIOR ART

Domestic dog owners often desire to temporarily confine their dogs in kennels. Generally, such containers are fabricated using rigid walls or panels that are permanently or semi permanently attached. Each panel generally comprises a pair of spaced vertical end posts and a plurality of horizontal and vertical cross rails. Each of the posts carries a part of a connector element for connecting that end post to the end post of the adjacent panel. In some designs, the connector comprises a vertical tubular portion that aligns with a corresponding tubular portion on the end post of the next adjacent panel for a simple rigid pin to be inserted through the aligned tubular portion to hold them in place. Additionally, many such containers have floor and ceiling panels which completely confine the animal. Furthermore, dogs therein contained are completely isolated from human interaction with the exception of peepholes or slits in the container walls.

U.S. Pat. No. 4,762,085 issued to Ondrasik discloses a collapsible wire animal cage consisting of six readily collapsible sides consisting of a releasable locking mechanism used for securing its panels. This design, although easily collapsible, limits human interaction with the animal. U.S. Pat. No. 5,564,367 issued to Boyanton, discloses a compact fenced enclosure that can be easily transported and stored, is simple in construction, and can be easily and quickly assembled or disassembled. The bottom rail of each panel design rests on the ground and its top is supported at a height from the ground to contain the animal. Again, the animal is isolated from human interaction. Moreover, this design is not favorable for indoor use. Many previously described containers have been constructed and others have been proposed including U.S. Pat. Nos. 5,452,681; 5,653,194; 5,375,815 and 5,201,498. The latter two U.S. patents issued to Akins describes a fencing system and method for confining farm animals. This design includes conventional rectangular fence panels having end posts and cross rails. The fence panels are connected by flexible elements of a type which allow the panel to be firmly attached. When an excited animal impacts the panel, the flexible element prevents damage to the panel while maintaining the animal properly confined. This design, although not applicable to domestic dogs, utilizes a flexible means to allow panels to separate under an applied force. In Akins' design, the fence panels are firmly supported by the flexible element which, in conjunction with the panels resting firmly on the ground, further restricts panel movement. The intent of Akins' design is to prevent damage to the fence panel by absorbing the impact of the force exerted on it (by the excited animal) through the flexible element. Hence, the flexible element acts as a buffer or shock absorber.

Although all of the previous animal cage structures accomplish their objectives to a greater or lesser extent, they significantly limit access to the animal. Additionally, these designs focus on containing the animal through incarceration whereas the present invention uses a combination of training and confinement. In the present invention, a container consisting of four panel members attached through a biasing element is presented. When panels are brushed against by the contained animal, they oscillate about a point. This oscillatory motion startles the animal causing it to move away from the panels and towards the center of the kennel, thus, reinforcing desired behavior.

OBJECTS & ADVANTAGES

It is therefore one object of the present invention to provide an improved collapsible and portable kennel system that enables human interaction with a confined domestic dog. Additional objects and advantages are:
(a) To provide a kennel system for a domestic dog that offers more space and an open top.
(b) To provide a kennel system that has low panels relative to the floor to allow for human interaction.
(c) To provide a kennel system that works in conjunction with the dog's natural instincts to reinforce training.
(d) To provide a lightweight, collapsible, aesthetically pleasing container that can be economically produced.
(e) To provide a kennel that can be modified to section off large room areas.

Further objects and advantages are to provide a kennel system that offers unprecedented convenience from the standpoint of ready assembly and disassembly, storage, washing, maintenance of hygienic conditions, as well as animal comfort.

DRAWING FIGURES

The invention will be better understood and objects other than those set forth above will become apparent when consideration is given to the following detailed description thereof. Such description makes reference to the annexed drawings wherein:

FIG. 10A is a top view of a room that has been sectioned.

FIG. 10B is a top view of wall attachment for extended panels.

REFERENCE NUMERALS IN DRAWINGS

| | |
|---|---|
| 10 Top spring bias cable | 11 Bottom spring bias cable |
| 12 Upper horizontal panel rail | 13 Cable |
| 14 Panel rocker | 15 Rocker hole for platform dowel |
| 16 Vertical stud | 17 Cable anchor bolt |
| 18 Upper slip-pen with ball bearing | 19 Spring-bias cable bolt |
| 20 Lower slip-pen with ball bearing | 21 Floor platform dowel |

-continued

| | |
|---|---|
| 22 Rail end slot | 23 Cable end connector |
| 24 Cable | 25 Spring-loaded ball bearing |
| 28 Panel connector hole | 29 Panel with fastening mechanism |
| 30 Padded floor platform | 32 Wall clamp |
| 36 Lower horizontal rail | 34 Wall |
| 38 Cable clamp | |

SUMMARY

A kennel system for small domestic dogs consisting of a floor platform and four panel members attached through a spring-biasing element is presented. The biased panel members can freely pivot about a point when brushed against by a domestic dog thus creating oscillatory motion. This motion startles the animal causing it to move away from the panel (after experiencing panel instability) and towards the center of the kennel, thus, reinforcing desired behavior.

Description—FIGS. 1–10

Figure 1:
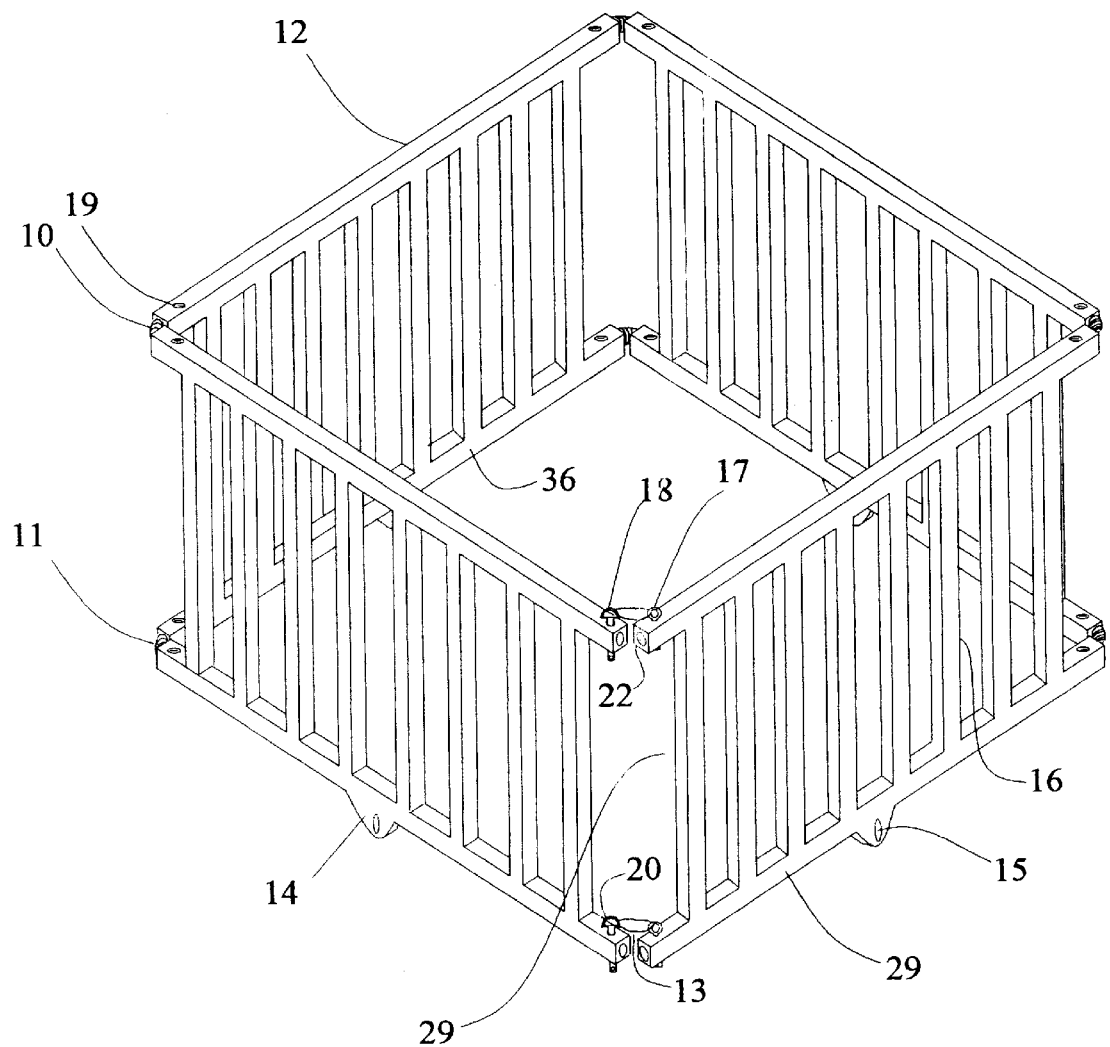
FIG. 1 is a perspective view of the preferred embodiment (not including floor platform) constructed in accordance with the principles of the present invention.

A typical embodiment of the container is shown in FIG. 1. The container consists of 4 identical panels (FIG. 5A) with rockers 14 extended from the lower horizontal rails 36. In the preferred embodiment these panels would be made of molded plastic, however, panels may be made of wood, fiberglass, or any other lightweight, rigid material. Each panel contains vertical studs 16 attached to an upper 12 and lower 36 horizontal rail. The vertical studs minimize the dog's ability to climb the panel. The panels are attached at the upper and lower rails by cables 24 (FIG. 6) although any non-flexible cord or chain will suffice. The spring 10 that surrounds the cable (spring biased cable, FIG. 8) is used to push the adjacent panels apart (bias) so that their ability to oscillate is not inhibited.

Figure 6:
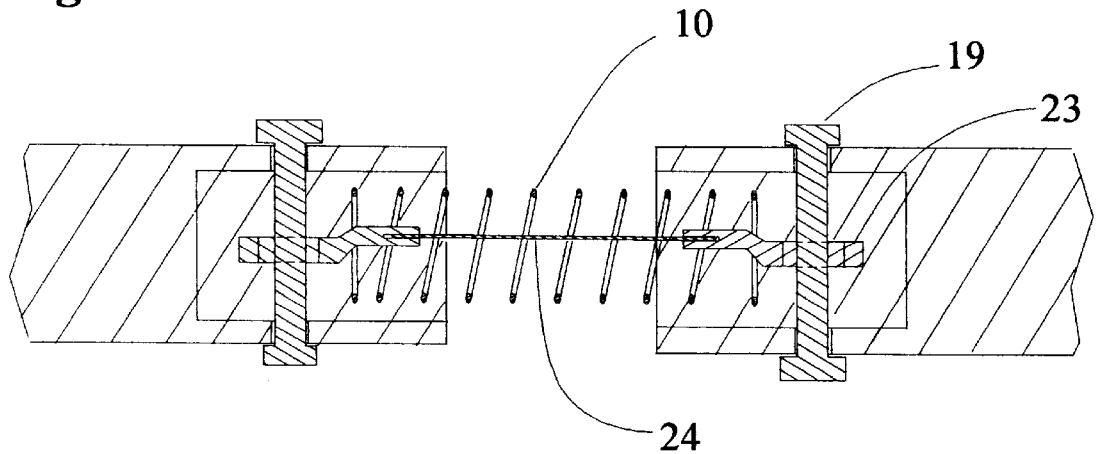
FIG. 6 is an enlarged cross section illustrating connection of adjacent panels using spring-biased cable.
Figure 8:
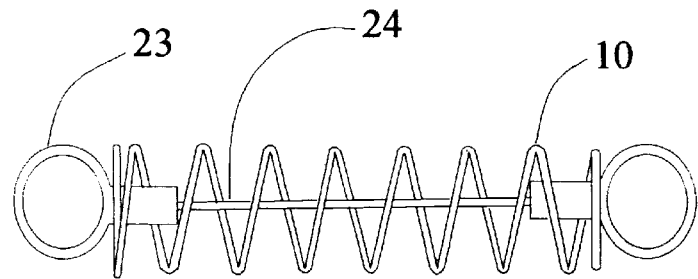
FIG. 8 is an enlargement of the spring-biased cable.

Each panel has 4 slots 22 (FIG. 5B) used to support the spring fixture and a hole 28 (FIG. 2) for the bolt that allows the spring biased cable to be attached to adjacent panels (FIG. 6). The spring biased cable may be bolted to the panel using end-caps 23 (FIG. 8). The rockers 14 contain holes 15 (FIG. 5A) that are used to attach the floor platform. The floor platform (FIG. 3) consist of a thin rigid material (plastic, wood, cardboard) that is padded for the dogs comfort. The floor contains four dowels 21. These dowels fit loosely into the rocker holes (FIG. 4) such that the panels can freely oscillate when brushed by the animal.

Figure 7:
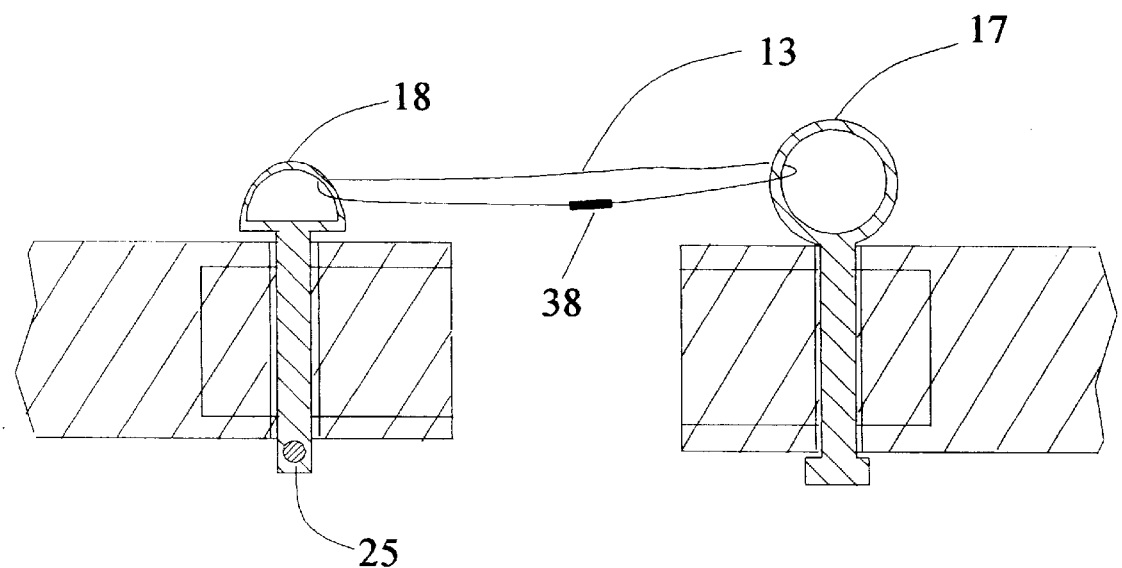
FIG. 7 is an enlarged cross section of panel fastening element showing connecting pens and cable.

The panels are closed by a cable connection (FIG. 7). The cable 13 is attached to a fixed anchor bolt 17 in the rail of one panel and to upper 18 and lower 20 slip pens, (commercially available part) in the adjacent panel. The slip pen consists of a spring loaded ball bearing 25 that allows the pen to be readily snapped in and out of the panel. The panel that contains the closing mechanism 29 serves as a gate through which the dog can enter and exit the kennel. Additionally, when the pens are removed, the floor can be readily removed and the panels can be folded for storage as show in FIG. 9. Additionally, the kennel system can be used to section a large room (FIG. 10A). Here, the kennel system functions in the same manner described above, however, the panel ends are attached to the walls (FIG. 10B) using a commercially available fixture 32.

Figure 2:
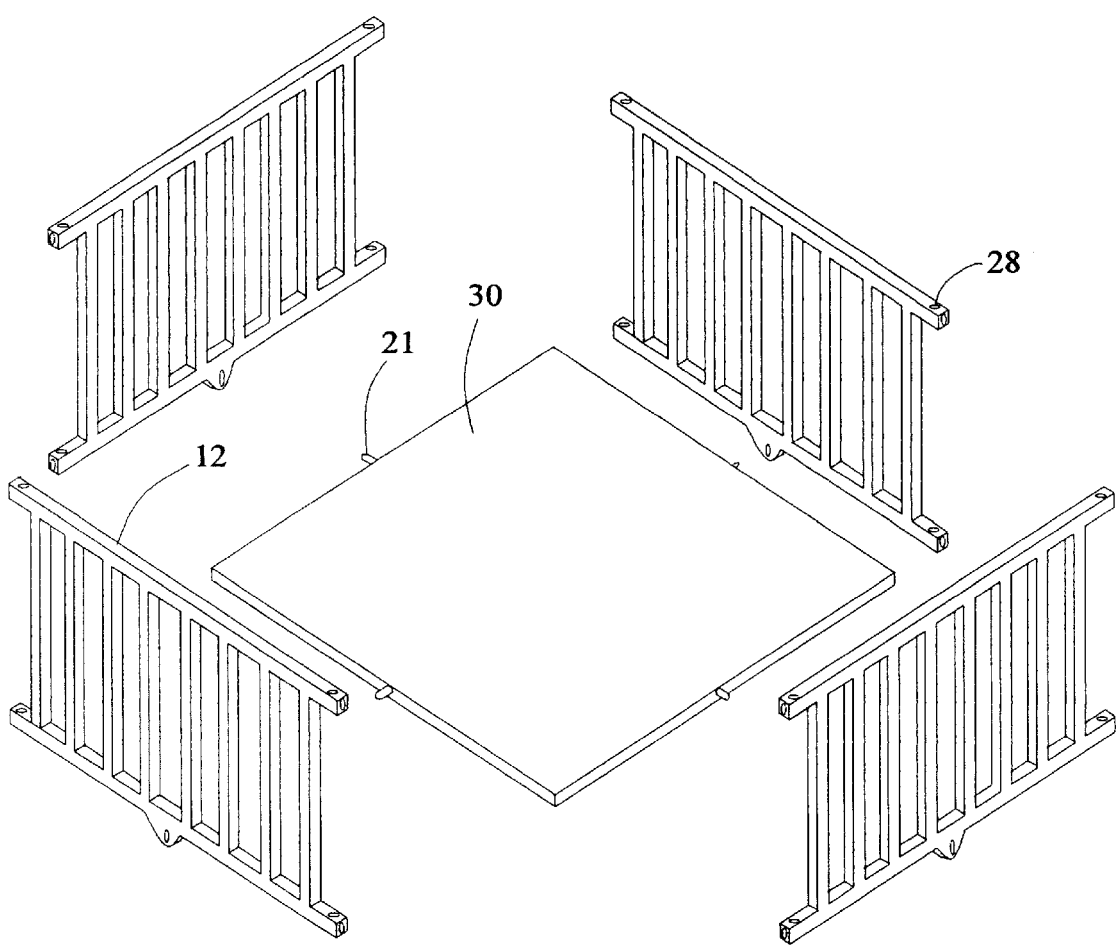
FIG. 2 is an expanded perspective view showing floor platform.
Figure 3:
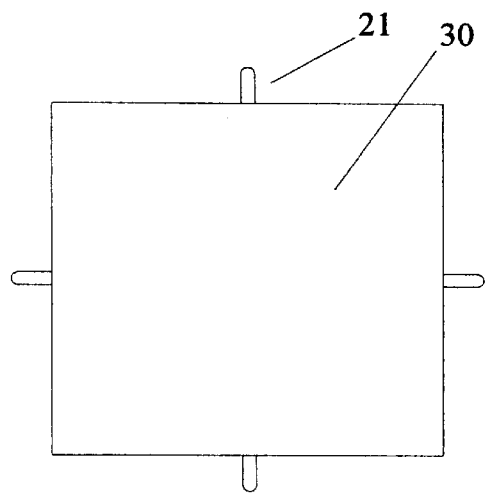
FIG. 3 is a top view of floor platform.
Figure 4:
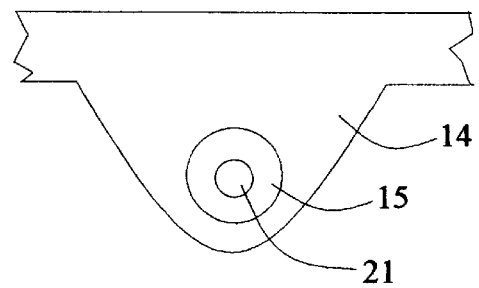
FIG. 4 is an enlarged front view of panel rocker showing rocker hole for insertion of floor platform dowels.
Figure 5B:
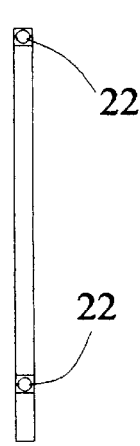
FIG. 5B is an end view of a panel showing notches for spring-bias cable.
Figure 5A:
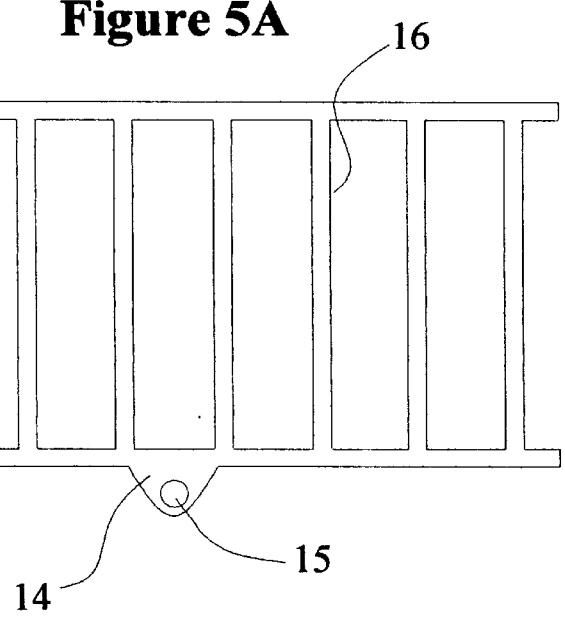
FIG. 5A is a front view of panel showing plurality of vertical studs fixed to two horizontal rails.

Operation—FIGS. 1, 2, 7

The manner of using the kennel system to contain a dog starting from a fully assembled container as shown in FIG. 1 (including the floor panel as shown in FIG. 2) is illustrated below:

(a) Remove the upper and lower pens 18 and 20 (FIG. 1) so that panel 29 can be opened.

(b) Allow dog to enter container through opened panel.

(c) Close panel by reinserting pens 18 and 20.

(d) Observe animal until it brushes against or tries to jump on the panel causing it to oscillate.

(e) While panels are oscillating and the animal is startled, verbally admonish animal.

Figure 9:
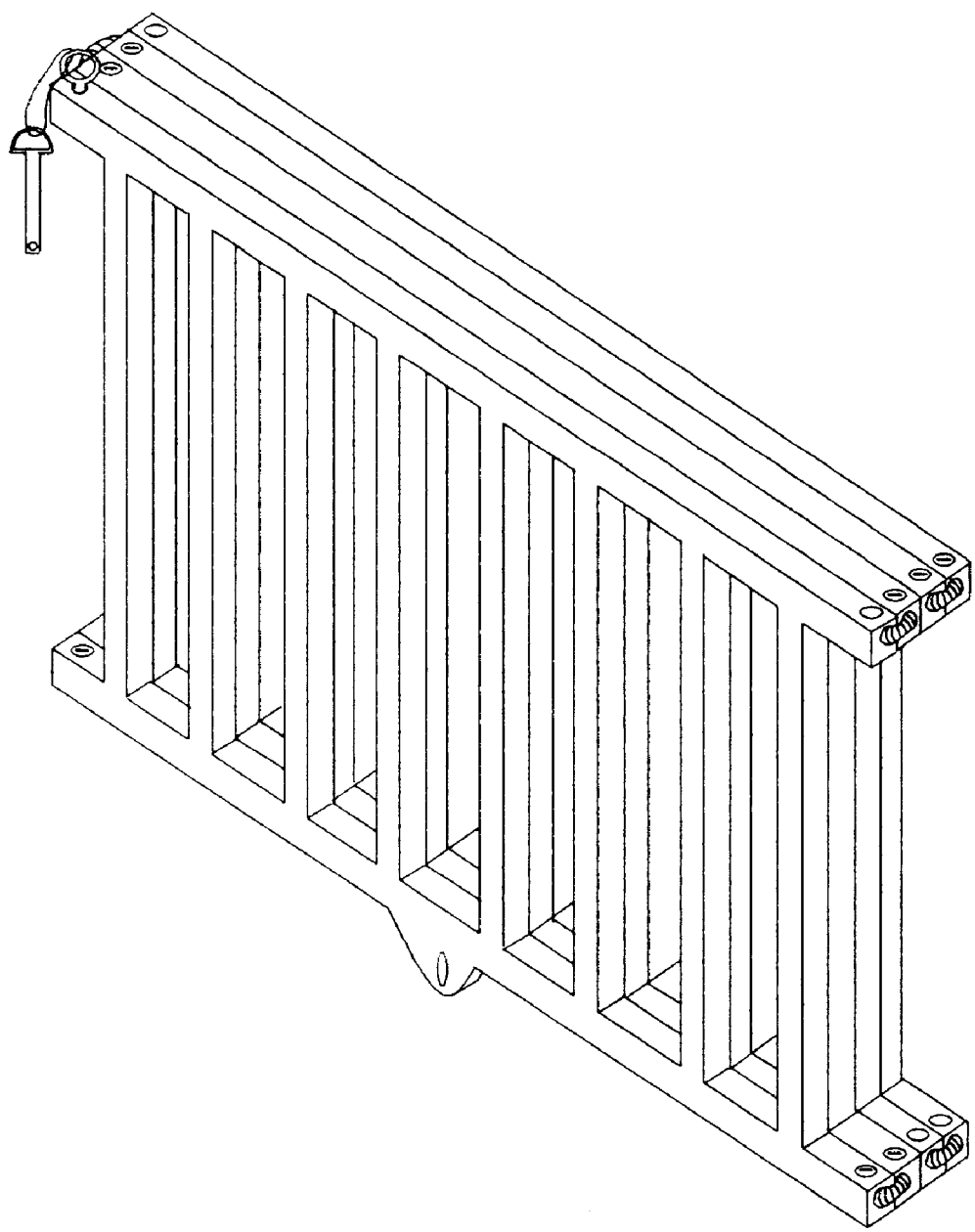
FIG. 9 shows folded panels with floor panel removed.

To collapse the container for storage, repeat step (a). Since the floor platform alignment dowel 21 (FIG. 3) are not attached to the panels, it can be readily removed. After removing the floor platform, the panels can be folded such that the first end is collapsed onto the next adjacent panel. These two folded panels can be collapsed onto the next adjacent panel, these three folded panels can be collapsed onto the next adjacent panel. This process continues until all of the panels are folded as shown in FIG. 9.

Conclusion and Ramification

Accordingly, it can be gleamed that the quasistable kennel invention for domestic dogs can be used to offer dogs more space and comfort as compared to the prior art. Furthermore, the quasistable kennel invention:

Leverages the dogs innate instinct to reinforce desired behavior as a result of the oscillatory motion of its panels.

When collapsed, the kennel system is very thin and can be easily stored or transported.

The quasistable kennel system can be used as an oscillating fence structure to section off large areas of a room.

The quasistable kennel's modular design reduces manufacturing costs.

Although the description above contains various modifications, these should not be construed as limiting the scope of the invention but as merely providing illustrations of some of the presently preferred embodiments of this invention. For example, the panel attachment can be accomplished by other means such as nylon rope, beaded string or flexible plastic. Noise, vibration, or thermal heating of the panels can accomplish the means by which the animal is startled. However, the end result of training which results in the animal moving away from the sides of the kennel is the same.

It is to be understood that the invention is not to be limited to the exact details of operation or exact compositions, methods, procedures, or embodiments shown and described, as obvious modifications and equivalents will be apparent to one skilled in the art, and the invention is therefore to be limited only by the fill scope which can be legally accorded to the appended claims.

What is claimed is:

1. A kennel system for confining an animal comprising:
   a floor platform
   at least three panels
   a plurality of couplers; and
   a rocker device attached to each of the panels for supporting each of the panels in an unstable manner, the panels are connected together by the plurality of couplers to allow relative movement of adjacent panels, the floor platform is loosely attached to the panels to allow relative movement of the panels while the floor platform remains stationary.

2. The kennel system of claim 1 wherein at least two dowels extend horizontally from said floor platform.

3. The kennel system of claim 1 wherein said floor platform is formed of a substantially rigid material and is surrounded by said panels.

4. The kennel system of claim 1 wherein a coupler of the plurality of couplers for connecting adjacent panels contain a cable inside of a spring, said cable and spring comprising a first end connected to one panel and a second end connected to a next adjacent panel.

5. The kennel system of claim 1 wherein panels are made of a substantially rigid material.

6. The kennel system of claim 1 wherein said rocker device allows panels to teeter and totter relative to each other.

7. The kennel system of claim 1 wherein said coupler for connecting adjacent panels further allows folding of panels one onto another.

8. The kennel system of claim 1 wherein at least two panels are configured for upper and lower wall attachment elements.

9. The kennel system of claim 8 wherein the wall attachment elements allow flexible movement of adjacent panels.

10. The kennel system of claim 8 wherein said panels are positioned substantially at right angles one relative to the other.

11. The kennel system of claim 8 wherein said floor platform is removable and said panels are attached to a wall.

12. A method for confining an animal comprising the steps of:

providing a floor platform and at least three panels attaching a behavioral reinforcement means to each panel for allowing said at least three panels to teeter and totter about a point;

coupling the panels such that the panels form a container;

attaching a wall attachment including a first end upper and lower wall clamp and a second end upper and lower wall clamp to the panels; and placing the animal into a container.

13. The method of claim 12 further comprising the step of providing wall attachments for coupling at least two panels to a wall.

14. A device for confining an animal comprising:

a plurality of sides a rocker device attached to each of the plurality of sides for supporting each of the plurality of sides in an unstable manner; and a spring bias cable for coupling each of the plurality of sides to allow relative movement of adjacent sides.

15. The device of claim 14 wherein the sides are configured to receive a floor platform, the floor platform being removably coupled to the sides.

16. The device of claim 14 wherein at least one side is attached to the next adjacent side using slip pens.

17. The device of claim 14 wherein at least one side is a door for allowing the animal to enter and exit the device.

18. The device of claim 14 wherein the spring biased cable allows relative movement of adjacent sides while restricting separation of adjacent sides.

* * * * *